United States Patent [19]

Whipp

[11] Patent Number: 5,370,727

[45] Date of Patent: * Dec. 6, 1994

[54] FLUIDIZED PROCESS FOR DIRECT REDUCTION

[75] Inventor: Roy H. Whipp, Miami, Fla.

[73] Assignee: Fior de Venezuela, Caracas, Venezuela

[ * ] Notice: The portion of the term of this patent subsequent to Apr. 19, 2010 has been disclaimed.

[21] Appl. No.: 47,943

[22] Filed: Apr. 19, 1993

[51] Int. Cl.$^5$ .............................................. C21B 13/14
[52] U.S. Cl. .................................... 75/436; 75/446; 75/450
[58] Field of Search ........................... 75/450, 436, 446

[56] References Cited

U.S. PATENT DOCUMENTS 5,082,251  1/1992  Whipp ................................. 266/172
5,185,032  2/1993  Whipp ................................. 75/450

Primary Examiner—Melvyn J. Andrews
Attorney, Agent, or Firm—J. P. Violette

[57] ABSTRACT

A fluidized bed direct process is discharged for reducing raw iron ore fines and directly producing a steel product. The disclosed process includes a process for feeding raw iron ore fines into a multi-stage reactor assembly; a process for reducing fines in fluidized beds developed by a counter-current flow of reducing gas, where the reducing gas is developed in a reformer assembly; and, a process for recycling offgas exiting said reactor assembly.

6 Claims, 1 Drawing Sheet

FLUIDIZED PROCESS FOR DIRECT REDUCTION

BACKGROUND OF THE INVENTION

1. Field of the Invention

This invention relates to a plant and method for producing compacted direct reduced iron using iron ore fines as the feedstock and natural gas as the source of reducing gas.

2. Description of the Prior Art

Iron ore reduction processes fall into two ore feedstock and two reduction mechanism categories. Processes which use static or moving beds in shaft furnaces use lump iron ore and iron ore pellets as the feedstock whereas fluid bed processes utilize iron ore fines as the feedstock. The two routes for the reduction of the ores are the production of reducing gas from natural gas by reforming and the direct reduction by carbon containing compounds such as coal.

A number of direct reduction processes have been perfected and have been operated commercially. The majority of plants being installed presently are moving bed systems operating with lump or pellet feedstock and using natural gas to produce the reducing gas by reforming. Iron ore in the form of fines is more plentiful but is only being used as a feedstock in one commercial direct reduction plant at present. This process, which uses fluid beds, has been covered by several patents, among them #07/501,490. The plant, owned by FIOR de Venezuela, has a higher energy consumption than the moving bed processes, and in spite of the lower cost fines feedstock, is not a viable alternative in some situations where energy costs are high.

Accordingly, there is a need to develop a direct reduction process which utilizes more plentiful and cheaper iron ore fines as a feedstock and which has a unit energy consumption similar to that achieved with the shaft furnace moving bed processes. Therefore, energy conservation is achieved by use of this process as compared to existing processes.

SUMMARY OF THE INVENTION

The present invention is directed towards an improved direct reduction assembly for reducing finely divided iron ore material in fluid beds using reducing gas generated from natural gas and steam.

The direct reduction plant assembly is comprised of an ore feed assembly, a preheat assembly, a reducing reactor assembly, a reducing gas generation assembly, a recycle gas assembly, and a product compacting and inerting assembly.

Iron ore fines of less than ¼" diameter are charged continuously to the preheat assembly by cycling pressurized lockhoppers in the ore feed assembly. The fines are heated in the preheat assembly by sensible heat of the hot reducing offgas from the uppermost reducing reactor. This preheater replaces a natural gas fired fluid bed preheater that is used in the present operating plant configuration and is more efficient than previous plants since heat is recuperated from the spent reducing gas and does not have to be supplied by burning natural gas.

The preheat assembly comprises a series of refractory lined cyclones in series which allow the incoming cold ore to be heated in a counter-current manner by the spent gas. The cyclones allow sufficient residence time for heat transfer from the gas to the solids. It has also been found to be possible to use an additional reactor similar to the reducing reactors as a preheater.

The preheated fines from the preheat assembly enter the reducing reactor assembly where the reduction process occurs in three fluidized beds at a pressure of approximately 10 atmospheres. The ore is fluidized by hot reducing gas which is a mixture of fresh reducing gas from the reducing gas generation assembly and recycle gas from the recycle gas assembly. The gas travels upward through the reactors while the ore travels downward by gravity resulting in a counter-current process.

Fresh reducing gas is generated in a reformer by heating a preheated mixture of natural gas and steam in catalyst filled tubes to about 850–875 degrees C. Where reaction to form H2 and CO occurs. These are the two principals components of the reducing gas. The required steam is generated in the heat recuperator of the reformer. Combustion air and natural gas are also preheated in the recuperator section in order to maximize thermal efficiency of the process.

The reformed gas is mixed directly with heated recycle gas without being cooled down first as is the case in the present plant. This improvement is possible due to the use of a lower ratio of steam to natural gas and a higher reforming temperature These conditions result in smaller amounts of H2O in the product reformed gas and it is therefore not necessary to cool the gas to condense out the unreacted steam prior to using the gas for reduction. In addition to the reduction in equipment requirements, the energy requirement of the process is also reduced, since the reformed gas does not have to be cooled and then-reheated to reaction temperature.

The recycle gas is formed from the exit gas from the preheater assembly. The gas is first quenched to cool it and to remove fines and H2O formed from the reduction reaction. The cleaned gas is compressed and then scrubbed to remove CO2 and H2S formed in the reduction process, and is then heated in a furnace to around 750–850 degrees C. before mixing with fresh reducing gas.

The preheating of the ore by spent reducing gas results in the formation of H2S from the reaction of S in the ore with H2 in the gas. The H2S in the recycle gas can be adjusted by varying operating conditions in the scrubber so that the need to inject H2S into the reducing gas to avoid metal dusting is eliminated. This is an advantage over the present process in which costly H2S has to be injected.

Accordingly, it is the principal object of this invention to provide a direct reduction plant and process which uses iron ore fines as feedstock.

A further object of this invention is to provide a more economical direct reduction plant and process with reduced energy consumption. This is achieved by the elimination of a natural gas fired preheat reactor and direct use of the reformed gas in the reducing reactors.

A further object of this invention is to eliminate the use of H2S injection into the reducing gas in order to prevent metal dusting of the furnace tubes and other plant components.

A further object of this invention is to lower the fines inventory of the system by directly discharging de-entrained, reduced fines from the final cyclone to the product discharge line. Re-injection of de-entrained, reduced fines into the final reduction chamber have been proven to be deleterious to the operation of fines based direct reduction processes.

A further object of this invention is to provide a more compact direct reduction plant and process with reduced capital investment. The elimination of the ore preheater fluid bed with associated air compressor and scrubber, the elimination of the equipment required to cooldown the reformed gas, and the elimination of the H2S dosing system result in less capital investment. Use of a vertical freestanding reactor assembly also reduces structural costs.

BRIEF DESCRIPTION OF THE DRAWINGS

For a fuller understanding of the nature of the present invention, reference should be had to the following detailed description taken in connection with the accompanying drawing in which.

DETAILED DESCRIPTION OF THE PREFERRED EMBODIMENT

The Plant Assembly

Figure 1:
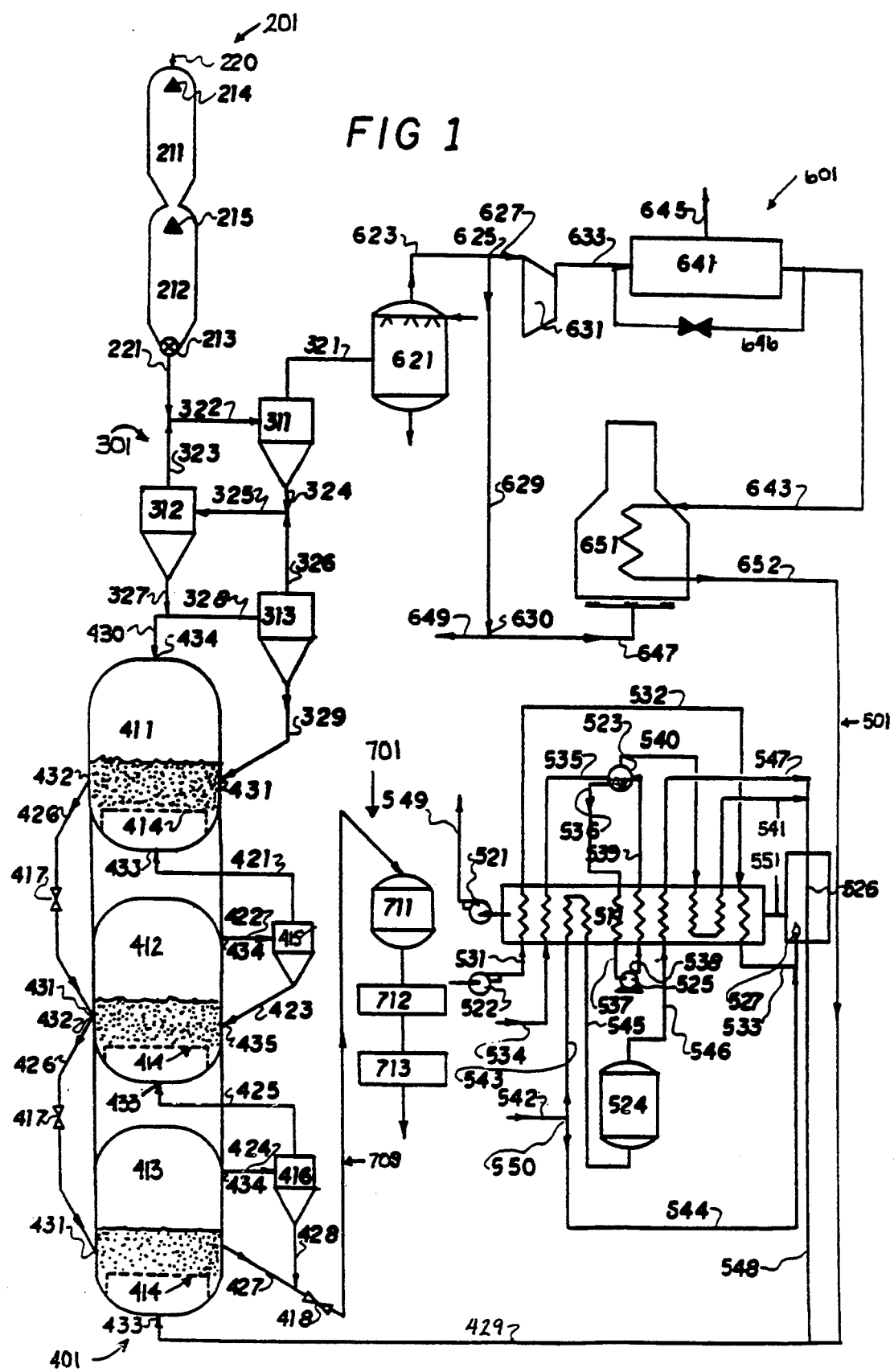
FIG. 1 is a perspective view of the overall plant including ore feed assembly, preheat reactor assembly, reducing reactor assembly, reducing gas generation assembly, recycle gas assembly, and briquetting assembly.

As shown in FIG. 1, the present invention is directed towards a direct reduction plant assembly, generally referred to as 11, and process for reducing finely divided iron oxide in fluidized beds and thereafter compacting and passivating the reduced material. Hereinafter, individual components and assemblies shall be referred to numerically and may be referenced in the drawing.

Referring to FIG. 1, the direct reduction plant assembly 11 is comprised of an ore feed assembly 201, a preheat assembly 301, a reducing reactor assembly 401, a reducing gas generation assembly 501, a recycle gas assembly 601 and a compacting/inerting assembly 701.

The ore feed, preheat, and reducing reactor assemblies are located in decreasing elevations so as to allow flow of the ore through the system by gravity. Due to the fact that the reactors operate at high pressure, the reduced product can be transported to the compacting/passivating assembly pneumatically, and therefore said compacting/passivating assembly is located at grade next to the reactor assembly rather than below it.

Through the incorporation of external ore transfer lines and cyclones into the process, the reducing reactors can be mounted vertically in a freestanding manner which results in a more compact layout and reduced structural steel requirements.

The Plant Process

The present invention is directed to a plant and process for direct reduction utilizing a multi-stage fluid bed reactor system in which the fluidizing and reducing gas is produced by reforming of natural gas. The process operates at high pressure and utilizes a recycle gas stream to improve its efficiency.

The reducing gas is comprised principally of CO and H2 but contains smaller amounts of methane, water, and carbon dioxide. In the reactors, the CO and H2 react with the iron ore fines to form CO2 and H2O. These two reaction products are removed in the recycle gas assembly to increase the reducing power of the recycle gas so that it can be recycled.

The hot reduced product is compacted to a density of 5.0 g/cc by suitable commercially available compacting systems and is inerted by rapidly cooling with either air or water.

Ore Feed Assembly

Referring to FIG. 1, two 100% capacity ore feed assemblies 201 are provided in order to maintain feed rate constant in case of problems with one ore feed assembly. Only one of the two identical ore feed assemblies 201 is shown in FIG. 1.

The lockhopper vessels 211 and 212 are conical pressure vessels constructed of carbon steel which have material inlet valves 214 and 215 and pressurizing and de-pressurizing lines (not shown). The upper lockhopper 211 is charged through line 220.

The upper lockhopper 211 cycles between atmospheric and reactor pressure while the lower lockhopper 212 operates continuously at reactor pressure. The discharge rate from lockhopper 212 is controlled by a variable speed star type feeder 213. The continuous flow of fines passes through line 221 to the preheat assembly 301.

Ore Feed Process

Prior to entry into the ore feed assembly, wet iron ore fines under $\frac{1}{4}$" in diameter and with a suitable particle size distribution for use in fluid beds are dried, transported to the top of the plant where the lockhopper vessels 211 and 212 are located, and discharged into the lockhopper inlet line 220 by gravity. The upper lockhopper 211 at this point is depressurized with the upper valve 214 open and the lower valve 215 closed. The upper valve 214 closes when charging is complete and the lockhopper 211 is pressurized to reactor pressure, the same pressure as in the lower lockhopper 212. The lower valve 215 opens when the lower lockhopper 212 has low level, and the charge is transferred by gravity. The valve 215 closes and the upper lockhopper 211 de-pressurizes to begin another cycle.

From the pressurized lower lockhopper 212 the dry iron ore fines are metered continuously to the preheat assembly 301 at a rate consistent with plant capacity.

Preheat Assembly

The preheat assembly 301 consists of three refractory lined carbon steel cyclones 311, 312, and 313 with the interconnecting lines 321 through 329.

The first cyclone 311 is connected to the ore outlet line 221 of the ore feed assembly 201 and the gas outlet line 323 of the next lower cyclone 312 by inlet line 322, which joins lines 221 and 323 at a juncture. The gas outlet line 321 connects cyclone 311 to the recycle gas assembly 601. The solids outlet line 324 of cyclone 311 connects with the gas outlet 326 of cyclone 313 to form a juncture at the inlet line 325 to cyclone 312. In the same manner, the solids outlet line 327 of cyclone 312 joins with the gas outlet line 430 of reactor assembly 401 to form a juncture at the inlet line 328 to cyclone 313. The solids outlet 329 of cyclone 313 is connected to the ore inlet 431 of the reducing reactor assembly 401.

Preheat Process

The function of the preheat process is to preheat the dry ore feed prior to introduction to the reducing reactor process while at the same time recovering the sensible heat of the reactor offgas, thereby improving the thermal efficiency of the process.

Cool, raw iron ore fines from the ore fee assembly 201 are discharged into the flow of gas exiting cyclone 312 and are heated by heat exchange with the gas. The solids are separated in cyclone 311 and drop by gravity to the inlet of cyclone 312. The cooled and cleaned gas from the cyclone 311 passes on to the recycle gas assembly 601 through line 321.

The preheated solids from cyclone 311 are further heated by the gas leaving cyclone 313 through line 326 and are separated from the gas in cyclone 312. The separated solids drop to the inlet of cyclone 313 where they are heated further by the offgas from the reactor assembly 401 which is passing though line 430. At this point the solids have attained a temperature in the range of 600 degrees C.

The hot iron ore solids are separated from the gas in cyclone 313 and pass through line 329 to the dense phase fluid bed of the uppermost reducing reactor in the reducing reactor assembly 401.

Reducing Reactor Assembly

The reducing reactor assembly 401 is comprised of three fluid bed vessels 411, 412, and 413 mounted vertically with refractory lined connections 421 through 430. The vertical arrangement of the vessels allows for optimum placement of, and good access to, the external cyclones and transfer lines as compared to a staggered or stairstep arrangement. By using the vessel walls and skirts as supports, the structure requirements are also decreased as compared to the present configurations used.

The respective reactor vessels 411, 412, and 413 are constructed of a carbon steel shell with refractory lining and are equipped with a grid 414 to distribute reducing gas uniformly across the cross section of the reactor. The gas distribution grid 414 is constructed of a thin circular heat-resistant alloy plate that is slightly smaller in diameter than the inside of the reactor. The plate is perforated with holes and equipped with inserts welded into said holes to improve gas flow distribution and minimize sticking of reduced ore fines in the holes. The circular grid plate is sealed to the carbon steel shell by a vertical cylinder made of thin heat-resistant alloy plate and is supported centrally by a series of alloy pipes welded to the grid and to the shell.

Reactor 411 is located at the highest elevation and is referred to as the uppermost reactor, reactor 412 is located beneath reactor 411 and is referred to as the middle reactor, and reactor 413 is located directly below reactor 412 and is referred to as the lowermost reactor. Each of said three reducing reactors 411, 412, and 413 include an ore inlet port 431, an ore outlet port 432, a reducing gas inlet 433, and a reducing gas outlet 434. Reactor 411 and 412 have an additional port 431 and 435 to return fines from the cyclone to the vessel. The reducing gas inlet ports 433 are located at the bottom of the vessels under the gas distribution grids and the reducing gas outlet ports 434 are located at the top of the reactor to allow gas to pass out of the vessel.

The respective ore inlet ports 431 are located about 2-3 meters above the grid elevation for passing ore into the dense phase fluid bed. The lines connected to the inlet ports extend into the vessel and terminate about 1 meter above the grid. The respective ore outlet ports 432 are located just above the grid elevation to allow reduced ore to overflow by gravity. These outlet lines extend into the vessels and terminate 1-2 meters above the grid elevation.

The reducing reactors are connected by two parallel external transfer lines, also known as standpipes, 426, for ore transfer (only one standpipe is shown in FIG. 1) which are internally lined with refractory material and equipped with a cycling slide valve 417.

The middle reactor 412 is equipped with an external cyclone 415 which is connected to it by line 422. The solids return line 423 from the cyclone 415 is connected to an ore inlet port 435 of the reactor 412. The gas outlet line 421 of the cyclone 415 is connected to the reducing gas inlet port 433 of reactor 411. In the same manner cyclone 416 of reactor 413 is connected to the reactor 413 by line 424, to reactor 412 by line 425, and to the product discharge line 427 by line 428.

The preheated reducing gas is supplied to the reactor assembly through line 429, passes through the grid 414 of the lowermost reactor 413 and reacts with the ore fines as it passes up through the fluid bed. The gas is cleaned of entrained fines in cyclone 416 and is passed on to the next reactor 412 through refractory line 425. The reducing gas passes through the grid 414 of reactor 412, reacts with the suspended iron fines, exits the reactor via line 422 and passes on to reactor 411 where the process is repeated. Gas existing reactor 411 via line 430 goes to the preheat assembly 301.

The reduced iron product from reactor 413 is supplied to a surge drum 711 by a refractory lined pneumatic transport line 709 which uses a cycling slide valve 418 to control withdrawal rate. Fines from the cyclone 416 are also discharged into the same line via line 428.

The resulting structure of stepwise feeders, preheaters and reactors provides a flow path for iron fines to travel downward in gravity flow through the system in series fashion, where each of said assemblies has been fixed in graduated, decreasing height from said ore feed lockhopper 211 to said lowermost reactor 413.

Reducing Reactor Process

The function of the reducing reactors 411, 412, and 413 is to remove oxygen from the iron ore fines in fluidized beds using a hot reducing gas as the fluidizing medium. There are three fluid beds in series. The ore fines flow downwards by gravity and the gas flows upward between the reactors in a counter-current manner. This counter-current contacting results in a higher utilization of the reducing gas as compared to a single fluidized bed.

The preheated ore fines are metered from the preheat assembly 301 into the first reducing reactor 411 where they are partially reduced by CO and H2 in the gas to a combination of wustite and iron at a temperature of 700-725 degrees C. and a pressure of 8-12 atm. The fluidizing and reducing gas is provided by line 421 from cyclone 415. This gas is the exit gas from the middle reactor 412 and therefore has a lower reducing potential than the reducing gas entering the lowermost or middle reactors.

The transfer between reactors 411 and 412 is made by parallel external standpipes 426 which connect the reactors. The external standpipes 426 are equipped with slide valves 417 to initiate solids flow during startup but the valves are left open during operation. This configuration has shown to be more reliable then internal transfer lines. The partially reduced fines fall by overflow from the ore outlet 426 of reactor 411, through the upper standpipes 426 joining reactors 411 and 412, and pass into reactor 412 by gravity.

The height of the dense phase fluid bed coincides with the level of the standpipe inlet or upper extremity so that reactor inventory is fixed by appropriate adjustment of the standpipe 426 extension above the reactor grid 414. A pressure seal is maintained in the transfer line by means of a column of fluidized solids at the exit of the standpipe inside reactor 412 to prevent gas by-passing.

Gases exiting the reactor 411 carry entrained ore solids which are removed in the preheat cyclones and are returned to the bed along with the ore feed through ore inlet 431. The feeding of fresh ore through the preheat cyclones has been found to prevent buildup of material in the cyclones as occurred in previous plants or processes where cyclones were used in ore reduction service.

The ore fines are further reduced in reactor 412 at a temperature of 725-750 degrees C. and a pressure of 8-12 atm. Gas for reduction and fluidization is provided from the cyclone 416 of reactor 413 which removes fines from the gas exiting said reactor. Fines overflow the reactor 412 through the standpipes 426 to the lowermost reducing reactor 413. The standpipes 426 connecting reactors 412 and 413 are identical in operation and design to those described for those connecting reactors 411 and 412. Reducing gas leaving reactor 412 contains entrained solids which are removed in cyclone 415 and the fines are returned to the fluid bed via line 423.

The fines are fluidized in the bed of the lowermost reactor 413 by fresh reducing gas at a temperature of 850-900 degrees C. from the recycle gas assembly 601 and the reducing gas preparation assembly 501. This gas is the hottest and has the highest reducing power of any gas in the plant and therefore reduces the ore fines to a final metallization level of 92-94% in this bed, where metallization is defined as (% metallic iron * 100)/(% total iron). Some carbon is deposited on the reduced ore in this bed as a result of CO and CH4 components of the gas. The percentage of carbon is maintained in the range of 1.0 to 1.5 weight percent.

The gases exiting the bottom most reducing reactor 413 are cleaned of fines in cyclone 416. The fines are directed into the product discharge line 427 rather than being returned to the vessel. This results in less fines inventory in the system and reduces the fouling and formation of hard deposits in reactor 413 which can disrupt production.

The reduced product is pneumatically transferred from the fluid bed of reactor 413 to the compacting/inerting assembly 701 by product discharge line 427 and line 709. Solids discharge rate from the system is controlled by slide valve 418.

Compacting/Passivating Assembly and Process

The compacting/passivating assembly is comprised of several compacting units in parallel (only one being shown in FIG. 1) which increases the density of the hot reduced iron ore to 5.0 g/cc. There are several commercially available processes which can be utilized. The compacting units are followed by cooling and inerting units which reduce the temperature from around 700 to 100 degrees C. The product is also inerted or passified in this step. There are commercial units available which use water or air as the cooling medium for this purpose.

Reducing Gas Generation Assembly

The reducing gas generation assembly 501 provides fresh reducing gas to the reactor assembly 401 to replenish gas used in the reduction reaction, and comprises a recuperator 511, an exhaust fan 521, an air blower 522, a steam drum 523, a desulferizer drum 524, a water pump 525, and a reformer 526.

Air blower 522 is connected to the first recuperator air preheat coil by line 531. The corresponding outlet line 532 for hot air from the first air preheat coil of recuperator 511 is returned to the recuperator 511 at the second air preheat coil. Line 533 connects the second air preheat coil to the air inlets of the multiple burners 527 of the reformer 526.

Treated water line 534 is connected to the water inlet of the recuperator water preheat coil, which in turn connects to the steam drum or separator 523 by line 535. From the water outlet on the bottom of the steam drum 523 water is passed through the steam generation coils through lines 536, 537, 538, and 539 passing through water pump 525. The steam outlet on top of the steam drum 523 is connected to the steam superheat coil of the recuperator 511 through line 540 and then to the catalyst tubes via line 541.

Natural gas is connected to the plant through line 542 and is divided at juncture 550 into line 544, which goes to the burners, and line 543 which goes to the inlet of the first natural gas preheat coil. The first natural gas preheat coil outlet is connected to the desulfurization drum 524 by line 545 and line 546 connects the outlet of the desulfurization drum 524 to the inlet of the second natural gas preheat coil of the recuperator 511. Line 547 connects the outlet of the second natural gas preheat coil and line 541 connects the outlet of the superheat coil of the recuperator 511 to the catalyst tubes in the natural gas reformer 526.

The reformer 526 includes a reformer box that is hermetically sealed and is connected to the recuperator 511 by duct 551. The recuperator 511 in turn connects to the exhaust fan 521 providing a path from said reformer 526, through over the recuperator 511 coils, and through said exhaust fan to vent combustion gases from said reformer 526 through line 549. The reformer box contains vertical catalyst filled alloy tubes and burners located at either the floor or roof level of the reformer 526. Reducing gas line 548 connects the exit of the reformer 526 and provides a path for natural gas after it has passed through the catalyzing tubes of the reformer 526 and been transformed to hot, reducing gas, to pass to said reactor assembly 401, after the juncture with line 652 to form line 429.

Reducing Gas Generation Process

The fresh reducing gas is produced by the steam reforming of natural gas over a catalyst surface at elevated temperatures. By utilizing a low ratio of steam to natural gas and maintaining a high reforming temperature, the amount of unreacted steam in the product is kept low, which enables the gas to be used directly for reduction.

Natural gas required for reforming has to be free of sulfur compounds in order to prevent poisoning of the reformer catalyst. It is preheated to 350 degrees C. in the first natural gas preheater coil of recuperator 511 and sent to a desulfurization drum 524 filled with a solid reactant which reacts with the sulfur compounds and removes them from the gas. The gas is further preheated to 500 degrees C. in the second natural gas preheat coil of recuperator 511 before being mixed with preheated steam for the reforming step.

The steam is produced by first heating water to around 200 degrees C. in the recuperator water preheat coil and then generating steam at 20 atm by pumping preheated water through the recuperator steam generation coil. The steam formed is separated from water in steam drum 523. The steam from the drum is superheated in the recuperator steam superheat coil to 500–550 degrees C. and mixed with natural gas at a mixing point prior to the entrance to the catalyst tubes of reformer 526.

The heated natural gas-steam mixture in the ratio of two 1.8–2.2 volumes of steam per volume of gas, enters the catalyst filled tubes of reformer 526 (only one tube shown) and is heated to 900 degrees C. as it passes down the tube. The reforming reactions which form H2 and CO occur as the gas passes through the tube. The gas exiting the tube contains some CO2, H2O, and unreacted CH4 from the natural gas.

The heat of reaction required for reforming is provided by gas fired burners in the radiant section of the furnace of reformer 511. The burners mix preheated air from air blower 522 with natural gas. The combustion gases pass through the recuperator 511 where the sensible heat of the gas is recovered by producing and superheating combustion air. The cooled combustion gas is extracted from the recuperator 511 by exhaust fan 521 and is sent to vent.

Recycle Gas Assembly

The recycle gas assembly 601 cleans and recycles spent reducing gas from the preheat and reactor assemblies 301 and 401 for re-use in the reactor assembly 401 and for use in the plant fuel system. It is comprised of a water cooled quench and venturi scrubber 621, a splitter juncture 625, a centrifugal compressor 631, plant fuel gas juncture 630, an acid gas scrubbing system 641, a gas fired furnace 651, and connecting lines 623, 627, 629, 633, 643, 645, 647, 649 and 652.

The inlet to the quench and venturi scrubber 621 connects to the gas outlet line 321 of the preheat assembly 301. The outlet of the quench and venturi scrubber is connected to a splitter junction 625 by line 623. Lines 627 and 629 connect the splitter juncture 625 to the low pressure inlet of said centrifugal compressor 631 and the plant fuel gas juncture 630, respectively, providing paths for a portion of cooled spent reducing gas to be re-pressurized and a portion to be utilized as fuel gas for the furnace 651.

Line 629 connects to a plant fuel gas juncture 630 and conduits 647, 649 connect the plant fuel gas juncture to the burners of furnace 651 and the plant fuel gas supply, respectively.

Line 633 connects the high pressure outlet of the compressor 631 to the acid gas scrubbing system 641, providing a path through which compressed reduced gas is purified by removing CO2 and H2S. Part of the gas can be bypassed around the system for H2S control through bypass line 646. The removed constituents pass through line 645 for recovery or venting, and the compressed and purified reducing gas is carried from the scrubber 641 by line 643.

Line 643 connects the heating coil inlet of furnace 651 and in turn line 652 connects to the heating coil outlet of furnace 651 providing a path through which compressed recycle gas may be re-heated and directed back to the reactor assembly 401. The recycle gas outlet line 652 joins with the fresh reducing gas outlet line 548 from the reducing gas generation assembly 501 and the mixture is sent to the reactor assembly 401 through line 429.

Recycle Gas Process

The recycle assembly is required to fully utilize the reducing gas produced in the gas generation assembly. Processes which use a once-through reduction scheme do not utilize all the reducing gas in reduction and a substantial amount has to be burned as fuel, which is not thermally efficient.

The spent reducing gas exiting the preheat assembly 301 still has a substantial amount of CO and H2 in it to be utilized. Due to the high levels of CO2 and H2O resulting from the reduction reactions in the reactor system, the reducing potential of the gas is low and the CO2 and H2O have to be removed in order to reuse the gas.

The H2O is removed to a low level (0.7–1.5%) by quenching the gas with water in scrubber 621. This venturi type scrubber 621 also removes entrained fines from the gas. Part of the gas is sent to the reheat furnace as fuel. When the recycled gas is correctly balanced with the generation of fresh reducing gas, the rest is recycled by compressing it in recycle compressor 631 and then removing CO2 and H2S in an acid gas scrubber 641.

The acid gas scrubber 641 removes part of the H2S formed by reaction of sulfur compounds in the ore with H2 of the reducing gas. Since a small amount of H2S is required in the reducing gas to avoid metal dusting attack of the furnace tubes and reactor internal, the scrubber design and operation is adequate to allow this level to be controlled, by using the bypass when required.

The gas exiting the scrubber 641, now low in H2O and CO2, is heated to 750–850 degrees C. in furnace 651 using some reducing gas as fuel. The hot gas from the furnace 651 is combined with gas from the reducing gas generation assembly 501 and sent on to the reactor assembly 401.

It is therefore to be understood the following claims are intended to cover all of the generic and specific features of the present invention herein described, and all statements of the scope of the invention which as a matter of language, might be said to fall there between.

Now that the invention has been described, what is claimed is:

1. A process for direct reduction of raw iron ore fines under ½" diameter in a direct reduction plant including an ore feed assembly, a multi-stage fluid bed reactor assembly including a preheat assembly, a compacting-/inerting assembly, a reducing gas preparation assembly, and a recycle gas assembly, comprising:
   a) continuously charging raw iron ore fines at a predetermined ore feed rate into said preheat assembly;
   b) heating said fines by sensible heat of hot reducing offgas exiting said reactor assembly;
   c) maintaining said reactor assembly in a pressurized state of at least 5 atmospheres;
   d) fluidizing said fines in said reactor assembly and producing a 92+% metallized product by
      i) developing at least three pressurized beds of iron ore staggered downward from an upper bed to a lower bed;
      ii) fluidizing said beds by passing a product reducing gas upward through each of said beds from said lower bed to said upper bed, the product reducing gas including oxygen, mixing a quantity of the oxygen into the fines from the product reducing gas; and iii) removing a portion of the oxygen from said fines by continuously passing said preheated ore charge by overflow through each of said beds from said upper bed to said lower bed gravimetrically; and e) compacting reduced iron ore fines.

2. A process for direct reduction as in claim 1, said process for direct reduction including an ore feed cycling process, said ore feed cycling process including a) charging iron ore fines under $\frac{1}{2}''$ to an upper lockhopper at atmospheric pressure, where the ore inlet of the upper lockhopper is open and the ore outlet is closed;

b) upon completion of charging the upper lockhopper, the ore inlet is closed and the upper lockhopper is pressurized to reactor pressure;

c) continuously discharge iron ore fines from said lower lockhopper into said preheat assembly;

d) when the level of ore is low in said lower lockhopper which is maintained at reactor pressure, opening the ore outlet of the pressurized upper lockhopper;

e) upon completion of charging the lower lockhopper, closing the ore outlet of the upper lockhopper, de-pressurizing the upper lockhopper, and opening the ore inlet of the upper lockhopper for re-filling with iron ore fines;

f) re-commencing steps a, b, d, and e.

3. A process for direct reduction as in claim 1, said process for direct reduction including a preheat process, said preheat process including a) heating downward flowing iron ore fines from said ore feed assembly with upward flowing gases exiting a middle cyclone;

b) separating fines from gases in an upper cyclone;

c) discharging fines downward from said upper cyclone and heating by mixing with upward flowing gases exiting a lower cyclone;

d) separating fines from gases in said middle cyclone;

e) discharging fines downward from said middle cyclone and heating by mixing with upward flowing gases and entrained fines exiting said reducing reactor assembly;

f) separating fines from gases in said lower cyclone; and, g) discharging fines into said reducing reactor assembly.

4. A process for direct reduction as in claim 1, said process for direct reduction including a reducing reactor process, said reducing reactor process including a) developing fluid beds by
i) depositing downward flowing fines from said preheat assembly into an uppermost fluid bed;
ii) directing overflow fines from said uppermost fluid bed through successively lower fluid beds;
iii) providing an upflow of hot reducing gas from said reducing gas preparation and recycle gas assemblies through a lowermost and successively higher beds, where the temperature and rate of flow of said hot reducing gas is pre-determined to fluidize and reduce said fines;
iv) directing fines with respect to said hot reducing gas in a counter- or cross-current relation in order to facilitate higher reducing activity; and, b) transferring reduced fines from said vessels to an elevated surge drum vie pneumatic transport by utilizing the vessel pressurization for controlled delivery to compacting/passivating assembly.

5. A process for direct reduction as in claim 1, said process for direct reduction including a reducing gas preparation process, said reducing gas preparation process including a) heating and desulfurizing natural gas; and, b) producing fresh reducing gas by steam reforming of natural gas of step (a) over a catalyst surface at elevated temperatures.

6. A process for direct reduction as in claim 1, the process producing an offgas from the reducing gas containing carbon dioxide (CO2) and water (H2O), said process for direct reduction including a recycle gas process, said recycle gas process including a) removing a portion of the CO2 and H2O from the offgas exiting said preheat assembly and developing a recycle gas by
i) quenching said offgas with H2O and removing entrained fines;
iii) compressing a portion of said quenched offgas to obtain a compressed gas;
iv) scrubbing the compressed gas to obtain a scrubbed gas;
v) burning a second portion of the quenched offgas to heat the scrubbed gas and to obtain a heated gas; and,
vi) delivering said heater gas in said reducing reactor assembly as recycle gas.

* * * * *